United States Patent [19]

Geokezas et al.

[11] 4,220,972
[45] Sep. 2, 1980

[54] LOW CONTRAST OBJECT EXTRACTION DEVICE

[75] Inventors: Meletios Geokezas, New Brighton; Rodney M. Larson, Anoka; David V. Serreyn, Wayzata, all of Minn.

[73] Assignee: Honeywell Inc., Minneapolis, Minn.

[21] Appl. No.: 41,453

[22] Filed: May 22, 1979

[51] Int. Cl.$^3$ .............................................. H04N 5/14
[52] U.S. Cl. ..................... 358/166; 358/169; 358/113
[58] Field of Search .......... 358/93, 95, 96, 113, 358/110–112, 109, 160, 166, 167, 169, 282, 280, 284, 125, 108; 340/146.3 AG, 146.3 MA; 364/515

[56] References Cited

U.S. PATENT DOCUMENTS

| | | | |
|---|---|---|---|
| 3,751,586 | 8/1973 | Johansson | 358/113 |
| 3,878,323 | 4/1975 | Fisher | 358/160 |
| 3,987,243 | 10/1976 | Schwartz | 358/160 |
| 4,127,873 | 11/1978 | Katagi | 358/166 |

*Primary Examiner*—John C. Martin
*Attorney, Agent, or Firm*—Charles G. Mersereau

[57] ABSTRACT

A system for automatic thresholding video data to educe and detect objects of interest from both high and low contrast imagery is disclosed here, which makes an object screening system adaptive to changing scene intensity and contrast levels automatically is disclosed. The real-time adaptive image interval extraction device extracts the edges of an object and simultaneously generates a bright signal for intensity larger than a given threshold. The interval, over which an object may exist, is derived from a logical combination of edge and bright signals. The video data is smoothed by a two-dimensional, weighted average, low pass or smoothing filter and passed through two filters, an edge filter and a bright filter. The edge filter determines the edge intensity magnitude associated between sucessive picture elements or pixels in the scan line of video data. An edge threshold is determined automatically from the average edge intensity of each scan line of data. When the data edge becomes greater than the edge threshold, a logical edge output is produced. In the same manner, the data is also passed through a bright filter which emphasizes data above a given background threshold. The background and threshold is updated on a line by line basis. This produces a logical bright signal when the intensity is above the automatically determined threshold.

7 Claims, 12 Drawing Figures

LOW CONTRAST OBJECT EXTRACTION DEVICE

The invention herein described was made in the course of or under a contract or subcontract with the Department of the Air Force.

BACKGROUND OF THE INVENTION

1. Field of the Invention

The present invention relates generally to an apparatus for improving the extraction of low contrast objects against a varying background and, more particularly, the invention relates to an apparatus for automating the thresholds for extracting the edges of objects, the high intensity levels (bright) relative to the background, and to define object intervals. The invention may use a visual or infrared input and the output may be displayed on a conventional video screen as a binary picture. The invention is useful for extracting objects against a varying background where it is most difficult to extract them with a single level threshold, for example, by pilots or gunners who are attempting to distinguish target objects from background areas.

2. Description of the Prior Art

Devices for detecting or improving the contrast of a video picture in an attempt to distinguish target objects from background for the purposes of target screening, night photography and other uses are known in the art. Such pictures can be reproduced on a video screen utilizing input from such detection devices as forward looking infrared scanners. With the speed of today's modern planes and other aiming devices, it is imperative that a candidate target objects be presented to the pilot or automatic firing system in real time and accurately. This can be achieved by cueing devices which operate on the outputs of video systems such as a forward looking infrared sensor. The image edges and intensity levels are extracted and combined in a logical way to extract intervals over which candidate objects may exist. In this manner, congruent candidate object intervals over successive scan lines are accumulated to extract the candidate objects.

One of the greatest problems found in the prior art with such systems lies in the fact that background is continually changing over an area scanned by the infrared or other sensor producing the image. Thus, the thresholds for the edge and intensity of a candidate object and the varying background are continually changing. Utilizing manual thresholds, the operator has had to continually adjust the thresholds based on the particular encountered conditions. This was done by the operator using the image display as the feedback mechanism to optimize the threshold levels. This, of course, resulted in detecting objects with varying degrees of success based on the skill of the operator. As a result, many objects which should have been properly extracted were missed and in addition an operator was continually tied up adjusting thresholds.

SUMMARY OF THE INVENTION

By means of the present invention, the need for manual threshold adjustment is eliminated so that the operator can perform other duties. This is done automatically by utilizing a unique system which adaptively computes the thresholds for edges and video intensities (bright) on a scan line by scan line basis. In the system of the invention, video data which may be from a visible or infrared source, is passed through a two-dimensional, weighted average, low-pass, smoothing filter to reduce the effect of high frequency noise. The smoothed data is then passed through two separate filters—an edge filter and a bright filter. The edge filter determines the difference in intensity within a matrix associated with each pixel element in each scan line of video data. An edge threshold for a given scan line is determined automatically based on the average of the last preceding scan line edge intensities for each scan line of data. When edge data indicates an edge intensity greater than the determined edge threshold, a logical EDGE output is produced indicating the location of the edge of a candidate object. In a similar manner, the data is passed through a bright filter which emphasizes data above a given adaptively determined intensity threshold. This threshold is also updated scan line by scan line based on the preceding scan line. A logical BRIGHT signal occurs when the output is above the adaptively determined threshold. The EDGE and BRIGHT outputs are combined in a logical way to extract intervals over which candidate objects may exist. These intervals are accumulated over successive scan lines to map out entire candidate objects. The objects so determined can be displayed as a logical (binary) picture on a screen or utilized for further processing or for production of hard copy in the form of a recorded output. By continually adapting the system to changes brought about by the continually changing input, the system of the present invention eliminates the requirement for manual thresholding in a logical and consistent manner.

BRIEF DESCRIPTION OF THE DRAWINGS

In the drawings wherein like numerals are utilized to designate like parts throughout the same.

DETAILED DESCRIPTION OF THE PREFERRED EMBODIMENT

Figure 1:
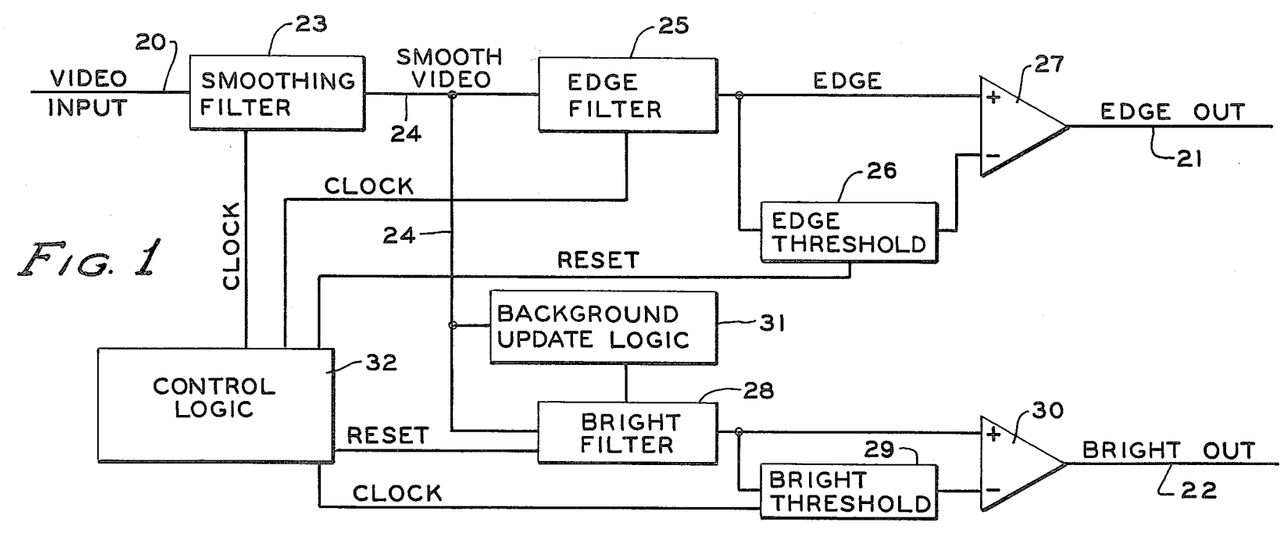
FIG. 1 is a functional block diagram of the auto threshold system of the invention.

In FIG. 1 there is shown a functional block diagram of the auto threshold system of the invention. Video input at 20 is processed by the system to obtain binary logic EDGE and BRIGHT signals at 21 and 22, respectively, for each scan line such that the combination may be utilized to produce total logical images of the man-made objects desired. The system includes a smoothing filter subsystem 23 which limits the bandwidth of the noise from the video input data. The smoothing filter details are shown in in FIGS. 4-7. The smooth video signal on line 24 is fed to the rest of the system which includes edge filter 25 with edge threshold 26 and edge comparator 27 which make up the edge subsystem utilized in the determination of the edge of an object producing the logic EDGE signal at 21. The circuitry for this subsystem is shown in greater detail in FIGS. 8 and 9. The bright determination subsystem includes a bright filter 28, bright threshold 29 and bright comparator 30 which are used in the generation of the BRIGHT signal 22. The details of this system are shown in FIG. 10. The autothresholding system of the invention also includes background update logic shown at 31 which utilizes edge and bright data to update the background level of the scene on a scan line by scan line basis and control logic for the system is shown in block form at 32 and in greater detail in FIG. 3. Each of the subsystems will now be described in detail.

Figure 4:
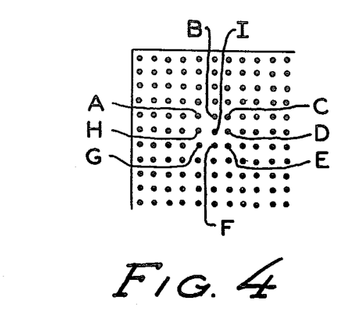
FIGS. 4-6 are diagrams of the smoothing filter parameters including pixels, 3×3 pixel locations and weighting functions of the pixels.
Figure 5:
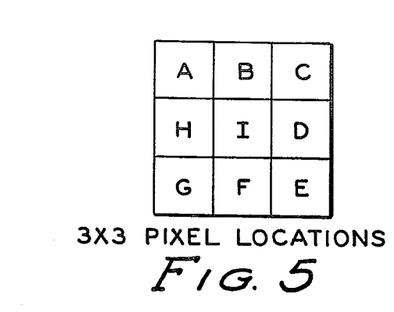
Figure 6:
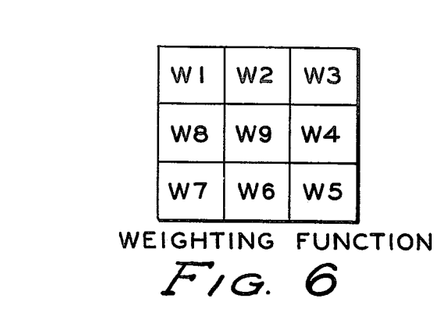
Figure 7:
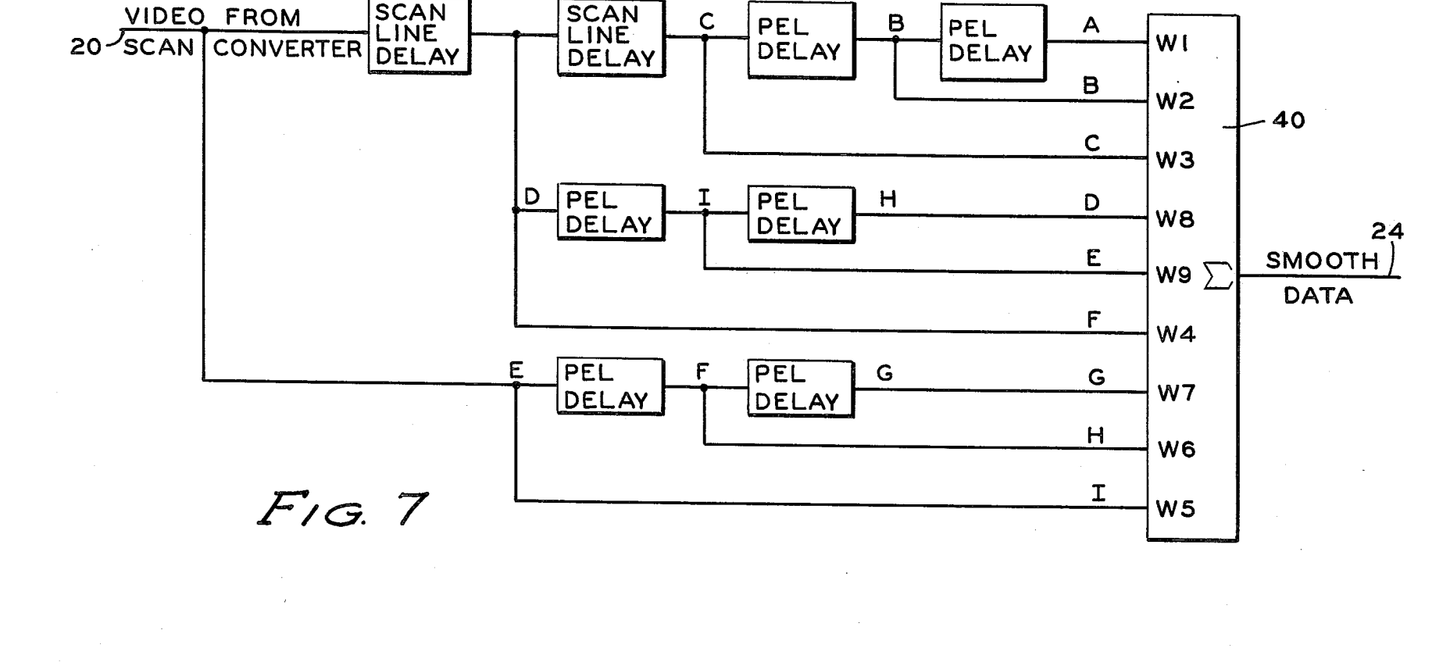
FIG. 7 is a functional block diagram of a weighted average smoothing filter.

In the smoothing filter system, FIG. 4 depicts an area matrix forming a minute portion of a typical video picture. The matrix consists of a number of points which are known as picture elements or "pixels". The matrix represents a portion of a display such as a picture on a cathode ray tube. The purpose of the low pass filter is to limit the amount of noise which enters into the edge and bright filters so that the threshold may properly be determined without interference. The smoothing filter applies a weight averaging system to an area surrounding a given pixel to produce a smooth or averaged output. The determination of the weighted average for a given pixel I is shown in FIGS. 5–7. Thus, in FIG. 5 we see that pixel I is surrounded by pixels A through H in a 3×3 pixel location matrix. In FIG. 6 each of the nine pixels is given a weighting value as seen in weighting values W1 through W8 surrounding W9 which corresponds to the pixel I. In the preferred embodiment, corner pixels A, C, E and G, corresponding to weights W1, W3, W5 and W7 are assigned the same value, namely 1. The pixels B, D, F and H are also assigned the same weighted values W2, W4, W6 and W8, namely 2. Pixel I, the pixel of interest, or W9 is assigned the highest value, 4. The matrix is then weighted as follows:

$$W1 = W3 = W5 = W7 = 1$$

$$W2 = W4 = W6 = W8 = 2$$

$$W9 = 4$$

or as an average utilizing the weighted values of FIG. 6. Thus, the smooth value, SI, can be shown by the equation:

$$SI = (A + 2B + C + 2H + 4I + 2D + G + 2F + E)/16$$

The number 16 is derived from the sum of the assigned values. The average value is then assigned as a value to the corresponding 3×3 pixel area of the image. Similarly, the system proceeds across repeating scan lines for the entire frame.

During normal operation, a video scanner scans the screen from left to right with 525 lines per frame divided into a primary scan of 262.5 lines and a secondary scan of 262.5 lines. Between scans, the scanner performs a flyback operation from right to left to begin the next scan line.

Thus, the matrix of FIG. 5 denoted by 3×3 pixels would be contained in a very small portion of 3 separate scan lines from left to right; the first containing pixels A, B, and C; the second containing pixels H, I, and D; and the third containing pixels G, F, and E.

The block diagram implementation of the system is shown in FIG. 7. In FIG. 7, there are two horizontally spaced boxes labeled "Scan Line Delay" and a plurality of horizontally and vertically spaced boxes labeled "Pel Delay" therein shown arranged in three horizontal rows having two such boxes per row. Signal lines corresponding to pixels A through I are denoted along with the corresponding weighting functions W1 through W9, respectively. All the values must be present at the same time in order for the summing and averaging functions to take place at 40 to produce the smooth data 24.

In order for this to take place, the earlier signals mut be delayed such that all signals are available at the same time. Each of the boxes containing the notation Pel Delay represents a delay line or shift register which delays a particular pixel signal by an amount of time as is necessary to move the incoming the signal 1 pixel. Each of the boxes containing the notation Scan Line delay represents a delay line register) which is of the magnitude sufficient to delay the signal by the time necessary for one entire line scan of the displayed device.

Thus, the first signal from pixel A must be delayed by an amount equal to two entire scan lines and two pixels to arrive at the same time as the signal of pixel E. As can be seen from the diagram of FIG. 7, the signal A is separated from the signal E by two pixel delays and two scan line delays such that the signal E arrives at 40 simultaneously with the signal A. All the signals in between are delayed the corresponding necessary amount of time such that the signals A through I corresponding to weights W1 through W9 can be simultaneously utilized in performing the weighted average function.

The smooth data on line 24 for each such 3×3 pixel matrix is utilized in making the determinations for the remainder of the auto threshold system of the invention. Thus it can be seen in FIG. 1 the smooth video at 24 is fed to the edge filter 25, bright filter 28 and the background update logic system 31.

The pixel and scan line delays may be commercially available charge coupled device delay lines, glass delay lines, surface acoustic delay lines or, in the case of the digital implementation, a random access memory or shift register may be used. In one successful embodiment of the invention two Fairchild CCD 321's were connected in series to provide the desired scan line delay time. A Fairchild CCD321VM can also be used for the scan line delay including the clockdriver. If necessary, at the end of each total delay an operational amplifier such as a National Semiconductor LM 318 may be provided to make up for loss of signal through the delay line due to charge transfer inefficiency. This was used in the same embodiment. Also, a buffer transistor was provided to prevent overloading of the CCD 321's. This is typically done in a well known manner in real time video applications. The individual pixel delay elements used in the same embodiment were 32 tapped delay line (TAD-32) manufactured by Reticon. The time difference between each tap is determined by the frequency of the input clock in a well known manner.

Figure 8:
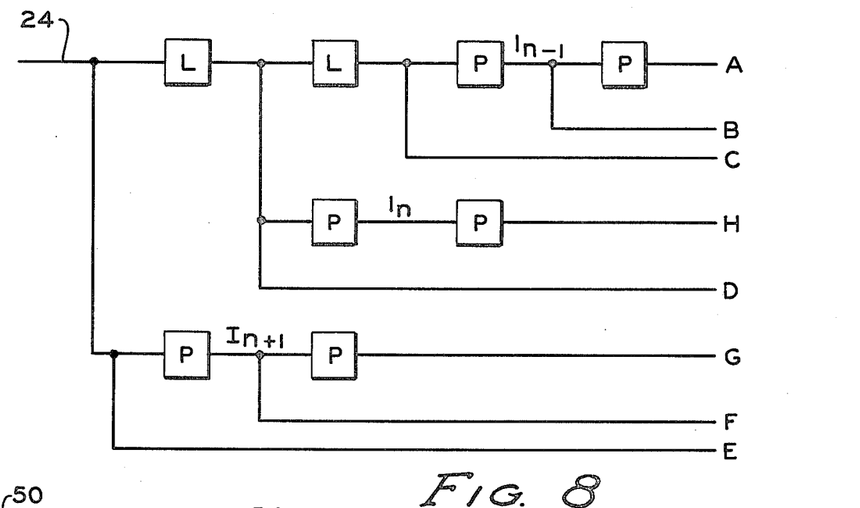
FIGS. 8 and 9 are functional block diagrams of the control circuitry for generation of the EDGE signal of the invention.

The edge subsystem will now be described. In regard to the edge determination, it should be noted that of several well known calculation methods available, including Sobel, Kirsch, Robert's Gradient and Gradient, a Sobel type calculation was utilized in the preferred embodiment to determine edge values. The Sobel edge determination, like the smoothing filter, depends upon the utilization of a two-dimensional pixel matrix. A 3×3 pixel matrix was also used, although this is also considered a matter of choice. As shown in FIG. 8, and utilizing letter designations (L for Scan Line Delay and P for Pixel Delay), the simultaneous values for the eight pixels surrounding pixel I are denoted on the lines to the right of the diagram. The pixel and the scan line delays of this system operate in the same fashion utilizing the same components as those utilized in the smoothing filter. The data is treated quite differently however.

The Sobel edge determination depends on the sum of the absolute values of the differences encountered in proceeding in horizontal and vertical directions during the scanning. Pixels adjacent to the pixel of interest are given a weighing factor of 2 and those located diagonally from the pixel of interest are given a weighting factor of 1 as they are used in both the horizontal and vertical determinations. Referring again to the matrix of FIG. 5, in determining the Sobel edge values of pixel I the following equations are used:

$$H2 = C + 2D + E$$

$$H1 = A + 2H + G$$

These are used in the horizontal determination. The vertical determination is made by the following equations:

$$V2 = G + 2F + E$$

$$V1 = A + 2B + C$$

A value is then assigned to the matrix about pixel I of the interest. If we change the nomenclature I to X to avoid confusion with intensity or other measurements, the value for the Sobel edge filter about pixel X is determined by the absolute value of the horizontal increase over the 3 lines plus the absolute value of the vertical increase over the 3 scans at the subject 9 pixel matrix including pixel X. Thus, the expression can be written:

$$E_X = |H2 - H1| + |V2 - V1|$$

Figure 9:
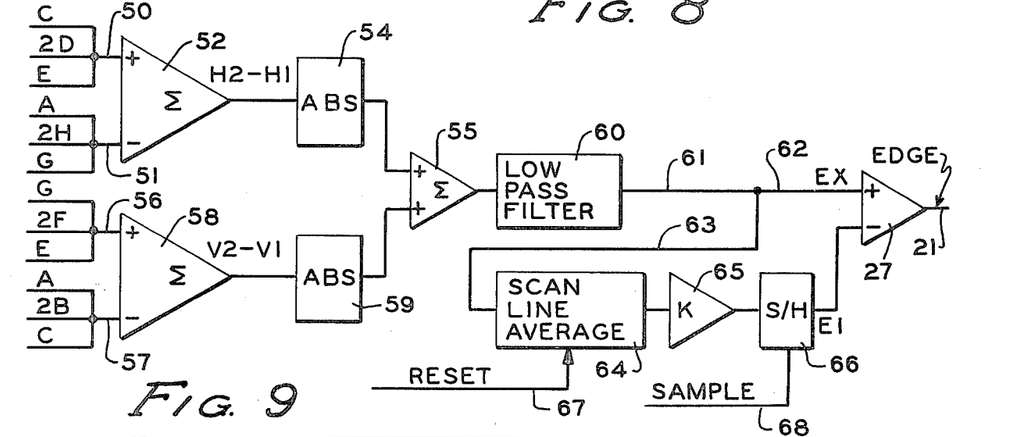
Figure 10:
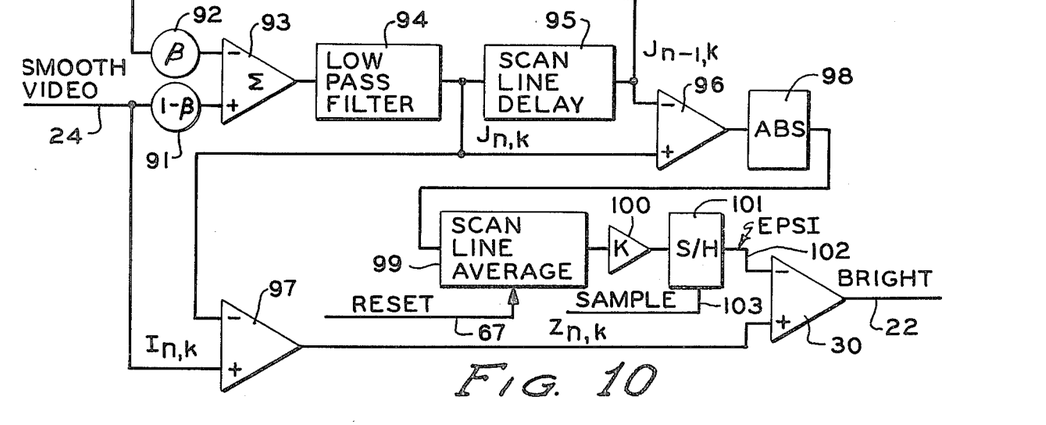
FIG. 10 is a functional block diagram of the control circuitry for the generation of the BRIGHT signal of the invention.

In FIG. 9 there is shown at 50 and 51 the inputs for H2 and H1 respectively, the output of the summing circuit 52 is the value H2-H1 as shown. The absolute value function is taken at 54, the details of which are shown in greater detail in FIG. 11. A similar set including inputs 56 and 57 and summing circuit 58 and absolute value circuit 59 in the same manner, generate the signal $|V2 - V1|$. This signal is also fed to the summing circuit 55 which determines the absolute value of the summation of the horizontal and vertical components. The summing circuits 52, 55, and 58 may be implemented utilizing conventional operational amplifiers which are readily commercially available. The signal from summer 55 is then passed through a low pass filter 60 where spurious clock noise which may have accumulated is eliminated.

Figure 12:
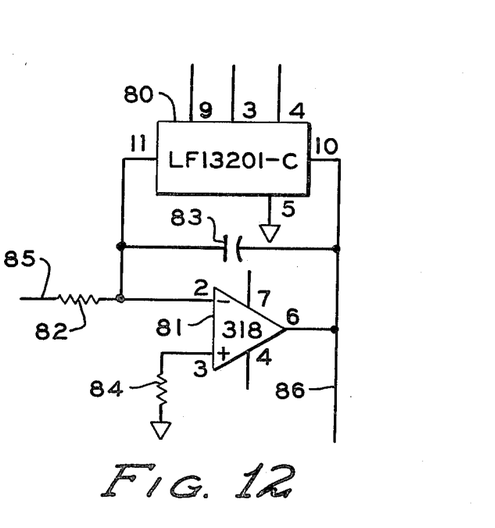
FIG. 12 is an averaging circuit utilized in the invention.

The signal on line 61 represents the absolute value of the vertical and horizontal difference components and is noted by the symbol $E_X$. The signal is passed via conductors 62 and 63 to comparator 27 and edge threshold circuitry, respectively. The scan line average 64, shown in greater detail in FIG. 12, is an integrator whose RC time constant is made equal to the scan line time. The circuit provides a scan line average value based on the average value of the previous scan line. A reset signal 67 resets the scan line average after each scan. This signal is multiplied by the constant K utilizing a commercially available operational amplifier multiplier 65 similar to those previously described. The constant k=1.75 was determined experimentally to give the best results. This system in effect constitutes the input to a sample/hold module 66 with sample output 68 which may be a commercially available DATEL SHM-IC-1. The sampling is done between scans and the hold is in effect during the scanning.

The signal E1 from the sample hold module 66 represents the edge threshold value and is compared in comparator 27 with the current signal of interest $E_X$. The comparator 27 is an LM 311 integrated circuit which is an analog comparator commonly available on the commercial market from such manufacturers as National Semiconductor. When the value $E_X$ exceeds the average threshold value $E_1$, a logic "1" is generated at the signal EDGE 21. Thus, the edge threshold $E_1$ is generated on a line by line basis based upon the previous scan line average and a logic EDGE signal may be generated by any given pixel X. Of course, the average value obtained during a scan is then utilized to produce the updated value $E_1$ for the next scan line in a similar fashion.

Figure 11:
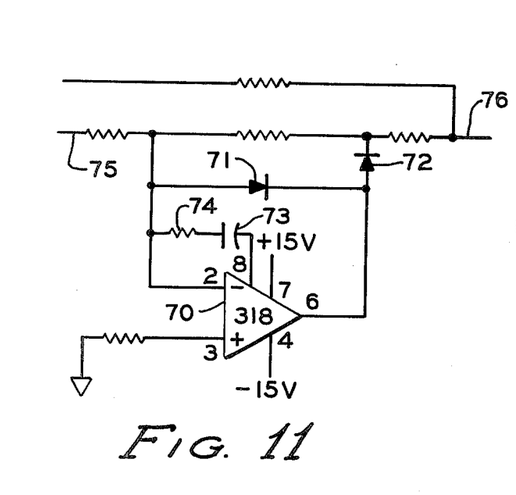
FIG. 11 is an electrical circuit utilized to determine absolute values in accordance with the invention.

As stated above, the absolute value circuitry of 54 and 59 is shown in FIG. 11. While absolute value determining circuits are available commercially, the frequency response is typically very low and therefore would not be suitable in the autothreshold application. The circuit shown in FIG. 11 includes an LM 318 operational amplifier shown at 70, diodes 71, 72 and capacitor 73 associated with resistor 74 and other typical system resistors which utilize the input from line 75 to produce the absolute value output on conductor 76 in a well known manner.

A scan line averaging system of 64 is shown in greater detail in FIG. 12 and represents a typical averaging circuit utilized wherever scan line averages are called for in the device. This system includes a switch 80 which may be a LF13201-C switch available from National Semiconductor and which operates in conjunction with an LM 318 operational amplifier 81. Resistor 82 along with capacitor 83 determine the RC time constant of the switch 80. Thus, the resistance of resistor 82 multiplied by the capacitance of capacitor 83 should give a time constant equal to the time required for the scanning system to scan 1 line. The resistor 84 to ground on the amplifier 81 is normally chosen equal to that of the resistor 82. The input is shown on line 85. The output on line 86, of course, leads to the module 65. In operation, at the end of each scan line, the switch 80 is closed by reset signal 67 to reset the integration to zero.

The operational circuit schematic diagram for the bright filter output is found in FIG. 10. The bright basically performs the function of estimating the background and making continually updated decisions as to whether the level of the background should remain the same or be changed based on the estimate. Background data is compared with signal intensity. When the intensity of a pixel is sufficiently greater than previous background data and the current background estimate, the BRIGHT output at 22 becomes a binary "1".

Figure 2:
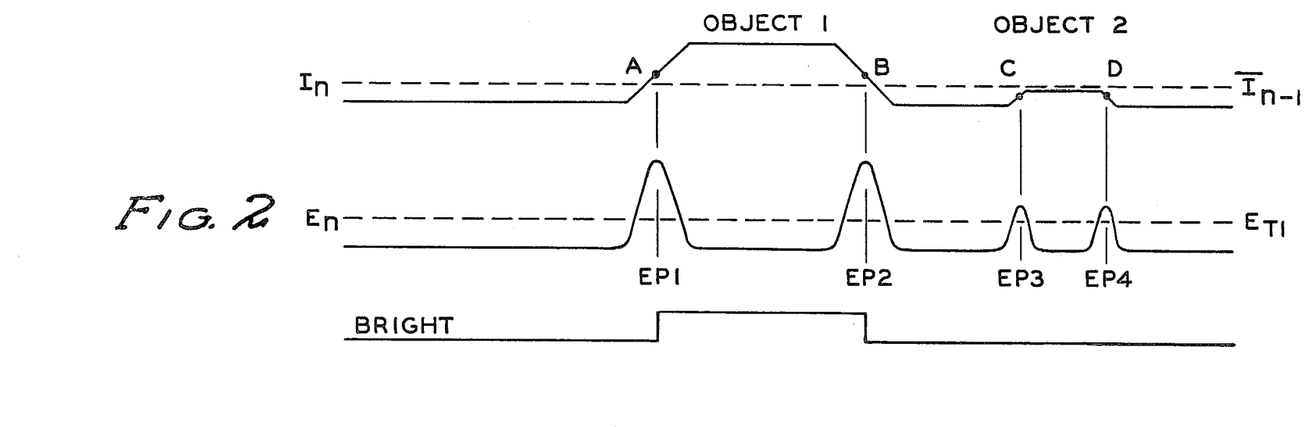
FIG. 2 is a diagram with a prior art sample scan with edge and bright.

In any such system, a BRIGHT is a logic signal which occurs if a pixel's intensity is greater than a given predetermined threshold value. An edge threshold is given by the nomenclature $E_{TH}$ as the dotted line second graph of FIG. 2. Note that in that second graph in FIG. 2, there would be several edges, notably at EP1–EP4, which denote edge peaks. At this same instant, the brightness intensity corresponding to the first graph of FIG. 2 at point or pixel A would be grabbed as a value and compared to the average value of the previous scan line. Because the value A is greater than the bright (represented by a dotted line) threshold, $\bar{I}_{n-1}$, the value A would be considered a BRIGHT and BRIGHTS would be generated for all values of I during that scan which are equal or greater than A. Hence, a BRIGHT signal is generated for the interval A to B and so on until the value of I is reduced below A. The next sample hold sequence in this system would be initiated at point EP3. At this point, however, a problem occurs because the value EP3 is above the edge threshold $E_{TH}$ but corresponding BRIGHT value C lies below the corresponding bright threshold $\bar{I}_{n-1}$. Therefore, insofar as this bright system is concerned, because the value C is less than the average sought, it is considered cold and no BRIGHT signal would be generated corresponding to the edge EP3. Similarly at EP4, another sample hold would be initiated but because D is less than $\bar{I}_{n-1}$ no bright would be generated. Thus, the object is missed.

Because of this and other problems, according to the present invention, a different bright concept has been developed which looks at a continuing background estimate and determines just what data should be included in the background and what data should be excluded. This system uses a recursive filter to determine the background level. The basis of the background determination is based on several equations as follows:

$$|I_{n,k} - I_{n-1,k}| > TLIM \qquad (1)$$

$$|I_{n,k} - J_{n-1,k}| > SLIM \qquad (2)$$

where $$TLIM = \frac{\alpha(\Sigma|I_{n,k} - I_{n-1,k}|)}{NUM}$$

$$SLIM = \frac{\gamma(\Sigma|I_{n-i,k} - J_{n-1,k}|)}{NUM}$$

$$J_{n,k} = \beta J_{n-1,k} + (1-\beta)I_{n,k}$$

NUM = number of pixels in scan line
n = scan line
k = pixel location
$I_{n,k}$ = intensity data for scan line n at pixel k
$J_{n,k}$ = background estimate for line n at pixel k
$Z_{n,k} = I_{n,k} - J_{n,k}$ $\Sigma$ denotes a summation
and $\alpha$, $\beta$ and $\gamma$ are predetermined constants having the following experimentally determined values.

$\alpha = 1.00$
$\beta = 0.95$
$\gamma = 4.00$

Before describing the schematic circuit details of the bright filter found in FIG. 10, some discussion as to the decisions being made by the system is in order. Before the system can function properly, certain background decisions have to be made concerning the data received. The first decision that has to be made is to determine whether there is a large intensity difference between the scan lines on a pixel by pixel basis. That is, the absolute difference between $I_{n,k}$ and $I_{n-1,k}$, where k is the pixel location within the scan line n or n-1, must be determined. This value is compared to a predetermined threshold TLIM. TLIM, in turn, as defined by the equation, is the average absolute difference between the present and previous scan line multiplied by the constant $\alpha$ which has been found experimentally to have a value of 1.00. In cases where no difference is found between scan lines, the scan line is also compared with the background. This is to eliminate the problem of sensor saturation or uniform object. To do this $I_{n,k}$ is compared with $J_{n-1,k}$ where I is the original intensity information and J is the background estimate. As shown in the equations, the background value $J_{n,k}$ is equal to the constant $(\beta)$ multiplied by the previous background estimate $J_{n-1,k}$ plus $(1-\beta)$ multiplied by the present scan line value $I_{n,k}$. It should be noted that if the absolute difference between the present scan and the previous scan line (on a pixel by pixel basis) is greater than the threshold TLIM or if the absolute difference between the present scan line and previous background estimate is greater than the threshold SLIM, then the decision is not to change the value of the background J.

As can be seen from the equations, the constants TLIM and SLIM are based on present and previous scan line data. TLIM is based on the average of the absolute difference between the present $I_{n,k}$ and the previous $I_{n-1,k}$ scan lines of smooth data. This data, then, when multiplied by the constant $\alpha$ becomes the variable threshold TLIM. In a similar fashion one determines the average of the absolute difference between the previous scan line $I_{n-1,k}$ and the previous scan line background estimate $J_{n-1,k}$. This absolute difference when multiplied by the constant $\gamma$ results in the constant SLIM. The data to be thresholded $Z_{n,k}$ is determined by subtracting the background estimate $J_{n,k}$ from the smooth data $I_{n,k}$.

Another threshold, epsilon (dubbed EPSI), is obtained by first determining the average absolute difference of adjacent background estimates and multiplying by a constant $\mu$ and dividing by $1-\beta$. The constant $\mu$ has been determined to be approximately 3.00. A logical BRIGHT output occurs when the value $I_{n,k} - J_{n,k}$ is greater than the value EPSI. The equation for EPSI is given by $$EPSI = \mu * VARJ = \frac{\mu}{Num(1-\beta)} \Sigma |J_{n,k} - J_{n-1,k}|$$

where VARJ is the variability of the background of the average absolute difference between adjacent background scan lines. EPSI is known as the bright threshold.

In FIG. 10 there is shown a circuitry implementation for the various thresholds required for the Bright circuitry. The video input is shown at 24. The $(1-\beta)$ and $(\beta)$ multipliers are shown at 91 and 92 respectively. The summing circuit is provided at 93 which leads to low pass filter 94 which is similar to the low pass filter 60 of FIG. 9. The appropriate scan line delay is provided at 95 and is similar to those previously discussed. Other summing circuits are shown at 96 and 97 along with an absolute value circuit 98 and scan line averaging circuit 99. The absolute value of circuit 98 and scan line averaging system 99 are similar to those previously discussed in relation to the FIG. 9. A constant K multiplier and sample hold circuitry are provided at 100 and 101 and these are also similar to those previously discussed in relation to the edge circuit diagram of FIG. 9.

As can be seen in FIG. 10, the pixel signal $I_{n,k}$ is multiplied by $\beta$ at 92 and $J_{n-1,k}$ is multiplied by $(1-\beta)$ at 91 and the values added at 93 to produce the signal $J_{n,k}$. The low pass filter 94 is used as in the other systems to remove clock noise eminating from the CCD scan line delay 95. A difference is taken between the present background data $J_{n,k}$ and that of the previous scan line at pixel k $J_{n-1,k}$ at 96 and the absolute value taken at 98.

At 99 a scan line average for one scan line time is then taken multiplied by a constant $\mu/1-\beta$ at 100 and sampled at the end of a scan line at 101 via conductor 102. This, as is readily understood from the above, produces the EPSI value signal on line 102 which is held during the duration of the next scan line. At the same time the background estimate signal $J_{n,k}$ is subtracted from the smooth video input data $I_{n,k}$ at 97 to produce $Z_{n,k}$. A logic "1" or BRIGHT signal is produced at 22 when $Z_{n,k}$ is greater than EPSI.

Figure 3:
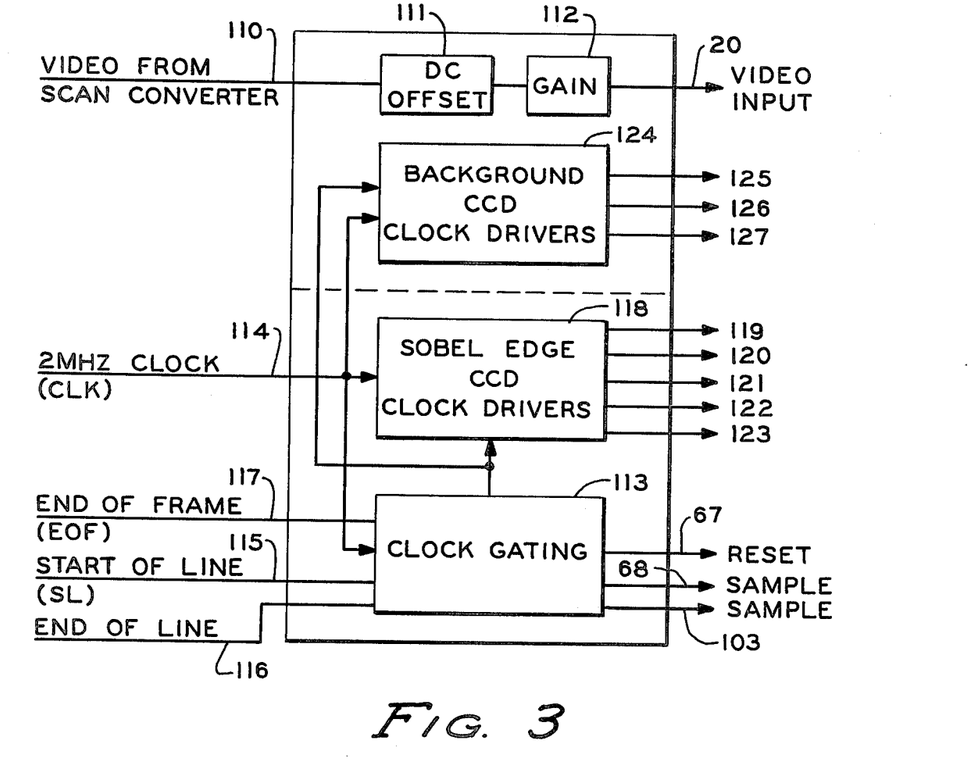
FIG. 3 is a control circuitry block diagram for the autothreshold system of the invention.

The control logic for the real-time autothresholding device of the present invention is shown in FIG. 3 which is a control circuitry block diagram. Because the raw video from a normal scan converter used in conjunction with the system, whose input is shown at 110, has a lower DC offset, as well as a lower voltage range than desired as input to the Sobel Edge and Bright circuitry, these are adjusted by a DC offset adjust 111 and voltage gain 112. These are adjustments which need be made only once and remain constant once the input video dynamic range has been established.

The gating of the clocks at 113 for the line delays is derived from the clock (CLK) signal 114, start of line (SL) signal 115 and end of line (E0L) 116. Using a 2 MHz clock, one video scan line is approximately 1 millisecond long and the line delays used in the system of the invention are configured to provide 1820 clock pulses of delay (0.9 ms). The clock gating logic provides a pulse equal to 1820 clock pulses which is slightly delayed from the start of the scan line to allow for the rise time of the scan converted output.

The clock driver circuitry 118 and 124 provides for the proper voltage level in the clocks as well as the relative timing between phases of the clock in a well known fashion. Two clocks having signals 119 and 120 are used for driving the Reticon TAD-32 32-tap analog delay lines for all pixel delays. The three clocks 121, 122 and 123 are the clocks used for driving the Fairchild CCD321's 455/910 analog delay lines 2 of which form the 1820 pixel scan line delays. Additional clocks at 124 are used to drive the background scan line delays. Signals for these are on lines 125, 126 and 127. Two groups of these clocks, then, are derived to keep the Sobel edge clock and the background clock separate in order to reduce cross talking and noise.

After each scan line, the integrators used for determining average values are cleared by the RESET signal 67. The end of frame (EOF) signal 119 allows for the generation of the 1820 clock pulses to initialize the background filter system for the next frame.

Of course, the system may be modified slightly in applications where it is not necessary that every pixel or scanned line be used in the creation of identifiable images. Thus, both the pixel sampling and line scan sampling may be spaced such that pixels or whole lines are skipped where desired. This is done where objects are relatively few and rather large in comparison with the scanned scene. Also other numbers of pixels can be used in the averaging and thresholding matrices if desired. In one embodiment only the horizontal component of the Sobel matrix was used.

Thus, it can readily be seen from the above that the autothreshold system of the invention provides automatic, continuous updating of edge and bright thresholds utilized in extracting logical object images from a low contrast input. This allows more accurate real-time data output from a scene screening system.

The embodiments of the invention in which an exclusive property or right is claimed are defined as follows:

1. A system for automatically thresholding edge and intensity (bright) signals for the extraction of low contrast objects in a video image comprising:
   a weighted average low pass video data smoothing filter, means for reducing input noise;
   an edge filtering system for determining the edge of an object, said edge filtering system further comprising:
   means for determining the absolute value of the relative intensity differences of pixels of interest in order of scanning;
   means for successively averaging the intensity of pixels of interest in each scan line and applying a constant factor thereto to produce an edge threshold value;
   means for sequentially obtaining the difference between the edge intensity of the pixels of interest in the next scanned line of interest with said edge threshold value to produce a logic output;
   a bright filtering system for determining logical bright portion of a scene indicative of an object of interest said bright filter system further comprising:
   means for determining the background threshold value wherein said background threshold value is the average of the absolute value of the difference in background estimate intensity between the current scan line of interest and the last scan line of interest based on pixels of interest with a constant having been applied thereto, and storing said value;
   means for sequentially obtaining a first difference wherein said first difference is the difference between the value of the intensity of each pixel of interest in the current scan line of interest and the value of the intensity of the background estimate for the same pixel;
   means for sequentially obtaining the difference between said first difference output and said background threshold for each pixel of interest in the current scan line of interest to produce a logic output;
   control system for controlling said edge and bright filter systems.

2. The system of claim 1 further comprising means for estimating the background intensity comprising:
   means for applying a constant factor to the value of the intensity of each pixel of interest to obtain a modified intensity value;
   means for applying a constant factor to the value of the intensity of the background of the last scanned line of interest to obtain a modified background value; and
   means for summing said two modified values.

3. The system of claim 1 further comprising display means for displaying an image derived from the outputs of said edge and bright outputs.

4. The system of claim 1 wherein said means for determining the absolute value of the relative intensity of pixels of interest in said edge filtering system further utilizes pixels on either side of each successive pixel of interest and sums the absolute value of the horizontal increase in intensity.

5. The system of claim 1 wherein said means for determining the absolute value of the relative intensity of pixels of interest in said edge filtering system further utilizes a matrix about each successive pixel of interest and sums the absolute value of the horizontal and vertical intensity increases in said matrix.

6. The system of claim 1 wherein said threshold value is compared with pixel intensities of each pixel of interest in the next successive scan line.

7. The system of claim 1 further comprising reset means for resetting said averaging means of said edge and bright filtering systems at the end of each averaged scan line.

* * * * *